(12) United States Patent
Roberts et al.

(10) Patent No.: US 7,321,734 B2
(45) Date of Patent: Jan. 22, 2008

(54) DIGITAL SYNTHESIS OF READILY COMPENSATED OPTICAL SIGNALS

(75) Inventors: Kim B. Roberts, Nepean (CA); Julian Fells, Epping (GB)

(73) Assignee: Nortel Networks Limited, St. Laurent, Quebec (CA)

(*) Notice: Subject to any disclaimer, the term of this patent is extended or adjusted under 35 U.S.C. 154(b) by 517 days.

(21) Appl. No.: 10/902,604

(22) Filed: Jul. 29, 2004

(65) Prior Publication Data

US 2006/0024069 A1 Feb. 2, 2006

(51) Int. Cl.
*H04B 10/04* (2006.01)

(52) U.S. Cl. .................. 398/193; 398/159; 398/194

(58) Field of Classification Search .......... 398/147, 398/158, 159, 192, 193, 194

See application file for complete search history.

(56) References Cited

U.S. PATENT DOCUMENTS

| | | | |
|---|---|---|---|
| 3,935,566 A * | 1/1976 | Snopko | 365/123 |
| 5,148,503 A | 9/1992 | Skeie | |
| 5,301,058 A | 4/1994 | Olshansky | |
| 5,311,346 A | 5/1994 | Haas et al. | |
| 5,349,312 A | 9/1994 | Huettner et al. | |
| 5,408,498 A | 4/1995 | Yoshida | |
| 5,416,626 A | 5/1995 | Taylor | |
| 5,446,574 A | 8/1995 | Djupsjobacka et al. | |
| 5,513,029 A | 4/1996 | Roberts | |
| 5,546,210 A * | 8/1996 | Chraplyvy et al. | 398/79 |
| 5,579,328 A | 11/1996 | Habel et al. | |
| 5,761,225 A | 6/1998 | Fidric et al. | |
| 5,892,858 A | 4/1999 | Vaziri et al. | |
| 5,949,560 A | 9/1999 | Roberts et al. | |
| 5,999,258 A | 12/1999 | Roberts | |
| 5,999,300 A * | 12/1999 | Davies et al. | 398/185 |
| 6,067,180 A | 5/2000 | Roberts | |
| 6,115,162 A | 9/2000 | Graves et al. | |
| 6,124,960 A | 9/2000 | Garthe et al. | |
| 6,128,111 A | 10/2000 | Roberts | |
| 6,205,262 B1 | 3/2001 | Shen | |
| 6,262,834 B1 | 7/2001 | Nichols et al. | |
| 6,304,369 B1 | 10/2001 | Piehler | |
| 6,441,932 B1 | 8/2002 | Helkey | |
| 6,473,013 B1 | 10/2002 | Velazquez et al. | |

(Continued)

FOREIGN PATENT DOCUMENTS

| | | |
|---|---|---|
| EP | 0 524 758 | 1/1993 |
| EP | 0 971 493 | 1/2000 |
| EP | 1 223 694 | 7/2002 |
| EP | 1 237 307 | 9/2002 |
| WO | WO 01/03339 | 1/2001 |
| WO | WO 01/91342 | 11/2001 |
| WO | WO 02/43340 | 5/2002 |

OTHER PUBLICATIONS

Adaptive Electronic Linearization of Fiber Optic Links, OFC 2003, vol. 2, pp. 477-480, Mar. 2003 Sadhwani et al.

(Continued)

*Primary Examiner*—Christina Leung
(74) *Attorney, Agent, or Firm*—Pearne & Gordon LLP

(57) ABSTRACT

A method and system for mitigating effects of dispersion in an optical link. A pair of digital sample streams are synthesized representing a target optical E-field having a spectrum selected such that the convolution of the spectrum with itself yields a signal having beat terms that contain phase information of the target optical E-field. A complex optical modulator is driven in accordance with the computed orthogonal sample values.

9 Claims, 3 Drawing Sheets

U.S. PATENT DOCUMENTS

| | | | |
|---|---|---|---|
| 6,559,994 | B1 | 5/2003 | Chen et al. |
| 6,580,532 | B1 | 6/2003 | Yao et al. |
| 7,023,601 | B2* | 4/2006 | McGhan et al. ............ 359/246 |
| 2001/0028760 | A1 | 10/2001 | Yaffe |
| 2002/0018268 | A1 | 2/2002 | Price et al. |
| 2002/0024694 | A1 | 2/2002 | Newell et al. |
| 2002/0106148 | A1 | 8/2002 | Schemmann et al. |
| 2002/0181052 | A1* | 12/2002 | Butman et al. ............ 359/154 |
| 2003/0011847 | A1 | 1/2003 | Dai Fa et al. |

OTHER PUBLICATIONS

Automated Measurement of Polarization Mode Dispersion Using Jones Matrix Eigenanalysis, IEE Photonics Technology Letters, vol. 4, No. 9, pp. 1066-1069, Sep. 1992, Heffner.

Chromatic Dispersion Mapping by Sensing the Power Distribution of Four-Wave Mixing Along the Fiber Using Brillouin Probing, OFC 2003, vol. 2, pp. 714-716, Herraez et al.

Design of Broad-Band PMD Compensation Filters, IEEE Photonics Technology Letters, vol. 14, No. 8, Aug. 2002, A. Eyal et al.

Dispersion Compensation by Active Predistorted Signal Synthesis, Journal of Lightwave Technology, vol. LT-3, No. 4, Aug. 1985, Thomas L. Koch and Rod C. Alferness.

Dispersion Compensation with an SBS-Suppressed Fiber Phase Conjugator Using Synchronized Phase Modulation, OFC 2003, vol. 2, pp. 716-717, M. Tani.

Electrical Signal Processing Techniques in Long-Haul Fiber-Optic Systems, 1990 IEEE-Transactions on Communications, vol. 38, No. 9, Jack H. Winters, et al.

Exact Compensation for both Chromatic Dispersion and Kerr Effect in a Transmission Fiber Using Optical Phase Conjuction, Journal of Lightwave Technology, vol. 14, No. 3, March.

High-Dynamic-Range Laser Amplitude and Phase Noise Measurement Techniques, IEEE Journal on Selected Topics in Quantum Electronics, vol. 7, No. 4, Jul./Aug. 2001, Ryan P. Sc.

Measurement of High-Order Polarization Mode Dispersion, IEEE Photonics Technology Letters, vol. 12, No. 7, Jul. 2000, Yi Li et al.

Mitigation of Dispersion-Induced Effects Using SOA in Analog Optical Transmission, IEEE Photonics Technology Letters, vol. 14, No. 8, Aug. 2002, Duk-Ho Jeon et al.

Performance of Smart Lightwave Receivers With Linear Equalization, Journal of Lightwave Technology, vol. 10, No. 8, Aug. 1992, John C. Cartledge, et al.

Polarization Effects in Lightwave Systems, Craig. D. Poole and Jonathan Nage, date unknown.

Polarization Modulated Direct Detection Optical Transmission Systesm, Journal of Lightwave Technology, vol. 10, No. 12, Dec. 1992.

Predistortion of Electroabsorption Modulators for Analog CATV Systems at 1.55 •m, Journal of Lightwave Technology, vol. 15, No. 9, Sep. 1997, Gordon C. Wilson et al.

Predistortion Techniques for Linearization of External Modulators, 1999 IEEE—Gordon Wilson, Lucent Technologies, NJ 07733, U.S.A.

Reduction of Dispersion-Induced Distortion in SCM Transmission Systems by Using Predistortion-Linearized MQW-EA Modulatirs, Journal of Lighwave Technology, vol. 15, No. 2, Fe.

Representation of Second-Order Polarisation Mode Dispersion, Electronics Letters, vol. 35, No. 19, Sep. 16, 1999, A. Eyal et al.

Signal Distortion and Noise in AM-SCM Transmission Systems Employing the Feedfrorward Linearized MQW-EA External Modulator, Journal of Lightwave Technology, vol. 15, No. 8, Aug. 1995, T. Iwai et al.

Soliton Transmission Using Periodic Dispersion Compensation, Journal of Lightwave Technology, vol. 15, No. 10, Oct. 1997, Nicholas J. Smith et al.

Theoretical Basis of Polarization Mode Dispersion Equalization up to the Second Order, Journal of Lightwave Technology, vol. 18, No. 4, Apr. 2000, Teruhiko Kudou et al.

H. Gysel et al. "Electrical Predistortion to Compensate for Combined Effect of Laser Chirp and Fibre Dispersion", Electronics Letters IEE Stevenage vol. 27, No. 5, Feb. 1991.

A. Mecozzi et al. "Cancellation of timing and Amplitude Jitter in Symmetric Links Using Highly Dispersed Pulses", IEEE Photonics Technology Letters, vol. 13, No. 5, May 2001.

Ram Sadhwani, Adaptive CMOS Predistortion Linearizer for Fiber-Optic Links, Journal of Lightwave Technology, vol. 21, No. 12, Dec. 2003.

P.S. Andre, et al., "Extraction of DFB Laser Rate Equation Parameters for Optical Simulation Pusposes", Conftele 1999 ISBN 972-98115-0-4.

Lucas Illing, et al., "Shaping Current Waveforms for Direct Modulation of Semiconductor Lasers", Institute for Nonlinear Science, U.C. San Diego, 2003.

P.M. Watts, et al., "Demonstration of Electrical Dispersion Compensation of Single Sideband Optical Transmission", London Communications Symposium 2003, University College London, ISBN-09538863-63, Sep. 2003.

Hoon Kim, et al., "10 Gbit/s 177 km transmission over conventional singlemode fibre using a vestigial side-band modulation format" Electronics Letters, vol. 37, No. 25 Dec. 6, 2001 pp. 1533-1534.

Henning Bulow, et al., "Disperssion Mitigation Using a Fiber-Bragg-Grating Sideband Filter and a Tunable Electronic Equalizer", Optical Society of America, 2000.

M. Sieben, et al., "10Gbit/s optical single sideband system" Electronics Letters, vol. 33, No. 11, May 22, 1997, pp. 971-973.

Schaffer, Troy A. et al "A 2GHz 12-bit Digital-to-Analog Converter for Direct Digital Synthesis Applications", GaAs IC Symposium, pp. 61-64.

Kamoto, T. et al "An 8-bit 2-ns Monolithic DAC", IEEE Journal of Solid-State Circuits, Feb. 1988, vol. 23, No. 1.

Feldhaus, G: "Volterra Equalizer for Electrical for Electrical Compensation of Dispersion and Fiber Nonlinearities", Journal of Optical Communications, Fachverlag Schiele & Schon, Berlin, De, vol. 23, No. 3, Jun. 2002, pp. 82-84, XP001130377, ISSN: 0173-4911.

* cited by examiner

DIGITAL SYNTHESIS OF READILY COMPENSATED OPTICAL SIGNALS

CROSS-REFERENCE TO RELATED APPLICATIONS

This is the first application filed for the present invention.

MICROFICHE APPENDIX

Not Applicable.

TECHNICAL FIELD

The present invention relates to optical signal transmitters for optical communications systems, and in particular to an optical signal transmitter capable of synthesizing readily compensated optical signals.

BACKGROUND OF THE INVENTION

Optical communications systems typically include a pair of network nodes connected by an optical waveguide (i.e., fiber) link. Within each network node, communications signals are converted into electrical signals for signal regeneration and/or routing, and converted into optical signals for transmission through an optical link to another node. The optical link between the network nodes is typically made up of multiple concatenated optical components, including one or more (and possibly 20 or more) optical fiber spans (e.g., of 40-150 km in length) interconnected by optical amplifiers.

The use of concatenated optical components within a link enables improved signal reach (that is, the distance that an optical signal can be conveyed before being reconverted into electrical form for regeneration). Thus, for example, optical signals are progressively attenuated as they propagate through a span, and amplified by an optical amplifier (e.g., an Erbium Doped Fiber Amplifier—EDFA) prior to being launched into the next span. However, signal degradation due to noise and dispersion effects increase as the signal propagates through the fiber. Consequently, noise and dispersion degradation become significant limiting factors of the maximum possible signal reach.

Dispersion, also known as Group Velocity Dispersion or Chromatic Dispersion, in single mode fibre at least, occurs as a result of two mechanisms:

a) Waveguide dispersion—within a single mode fibre, different wavelengths travel along the fibre at different speeds; and b) Material dispersion—the phase velocity of plane waves in glass varies with wavelength.

For the purposes of the present invention, references to "dispersion" shall be understood to mean the sum total of group velocity dispersion effects.

Mathematically, first order dispersion is the derivative of the time delay of the optical path with respect to wavelength. The effect of dispersion is measured in picoseconds arrival time spread per nanometre line width per kilometer length ($ps \cdot nm^{-1} \cdot km^{-1}$). The magnitude of waveguide and material dispersions both vary with wavelength, and at some wavelengths the two effects act in opposite senses. The amount of dispersion present in a link can also vary with the temperature of the cable, and if the route is changed (e.g., using optical switches). Dispersion in optical fibre presents serious problems when using light sources whose spectrum is non-ideal, for example broad or multispectral-line, or when high data rates are required, e.g., over 2 GB/s.

A known method of compensating dispersion is to produce an optical single sideband (OSSB) signal at the transmitter, typically by means of passive optical filters to suppress the unwanted sideband. FIG. 1a schematically illustrates an OSSB signal 2 in which the filter characteristic 4 used to suppress the unwanted sideband 6 (shown in dashed lines) is shown superimposed on the OSSB signal. At the receiver-end of the link, the OSSB signal is directly detected using a photodiode in a conventional manner, to produce an electrical signal (FIG. 1b) having terms corresponding to the carrier signal 8, the desired sideband 10, and noise 12. The carrier and sideband terms 8 and 10 contain the original phase information (and thus the transmitted data) of the inbound OSSB signal 2. Provided that the power level of the noise term 12 is low enough, this noise term can be removed by filtering, and accurate compensation of dispersion can be obtained by filtering the residual electrical signal using a transversal filter having a linear group delay response. This technique is disclosed in, for example, *Demonstration of Electrical Dispersion Compensation of Single Sideband Optical Transmission*, P. M. Watts et al., University College London; *10 Gbit/s 177 km transmission over conventional singlemode fiber using a vestigial side-band modulation format*, Hoon Kim and A. H. Gnauck, Electronics Letters, Vol. 37, No. 25, pp 1533-1534, 6 Dec. 2001; *Dispersion Mitigation Using a Fiber-Bragg-Grating Sideband Filter and a Tunable Electronic Equalizer*, H Bulow et al, Optical Society of America, 2000; and *10Gbit/s Optical Single Sideband System*, M. Sieben et al, Electronics Letters, Vol. 33, No. 11, pp 971-973, 22 May 1997.

A limitation of the above-described techniques is that real optical filters are imperfect, with the result that it is extremely difficult to produce a "pure" single sideband optical signal at the transmitter. In practice, at least some optical power remains in the unwanted sideband 6, resulting in the transmission of a "vestigial" sideband 6a, as shown in FIG. 1a. At the receiver-end of the link, the vestigial sideband 6a is convolved with both the optical carrier and the wanted sideband, and results in phase-distortions in the electrical signal generated by the photodiode. This effectively increases the noise term 12 in the electrical signal (FIG. 1b), and reduces the amount of dispersion that can be compensated by electrical filtering.

An alternative method of generating an OSSB signal is to sequentially drive amplitude and phase modulations of the carrier signal using phase-shifted versions of the same drive signal. Both modulations generate a pair of sidebands, which combine additively on one side of the carrier and subtractively on the other. When the amplitude and phase modulations are perfectly matched, one sideband is cancelled resulting in a "pure" OSSB signal. A mathematically equivalent approach is to use a dual-branch Mach-Zehnder (MZ) modulator, in which each branch is driven by a respective 90° phase-shifted version of a common drive signal. Both of these techniques are described by Sieben, M et al. (supra). U.S. Pat. No. 5,301,058 (Olshansky), which issued on Apr. 4, 1994, describes methods and apparatus for generating an OSSB signal using a dual-branch MZ modulator.

However, successful implementation of either of these technique relies upon perfect matching of the drive signals, electrical signal paths, and optical components. Normal manufacturing variations effectively preclude such a perfect match. Even if an "ideal" MZ modulator and a "perfect" Hilbert Transformer are obtained, the non-linear response of the MZ modulator means that a vestigial sideband will remain, at least for large signal operation. As a result, complete cancellation of the unwanted sideband is practically unobtainable, with the result that these techniques offer little or no performance improvement over passive filtering. Thus, for example, Sieben et al (supra) report simulation results suggesting that 10 Gbit/s OSSB signals can be transmitted over distances of >1000 km with post-detection electrical dispersion compensation. However, they report that transmission distances of only 200 km were achieved in actual experimental trials.

Accordingly, methods and apparatus for cost-effectively generating readily compensated optical signals remains highly desirable.

SUMMARY OF THE INVENTION

Accordingly, an object of the present invention is to provide methods and apparatus for generating readily compensated optical signals.

Thus, an aspect of the present invention provides a method of mitigating effects of dispersion in an optical link. A pair of digital sample streams are synthesized representing a target optical E-field having a spectrum selected such that the convolution of the spectrum with itself yields a signal having beat terms that contain phase information of the target optical E-field. A complex optical modulator is driven in accordance with the computed orthogonal sample values.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method of generating a signal having a spectral distribution that is designed to facilitate electronic compensation at the receiver-end of the link.

In general, the method of the present invention involves synthesizing an optical signal which, when convolved with itself, yields a signal having readily detectible terms that contain the phase information of the original optical signal. Optical signals having various different spectral distributions will satisfy this condition. For the purposes of the present invention, two signals will be described, namely: a high fidelity single sideband signal; and a signal composed of a series of optical frequencies.

Figure 2:
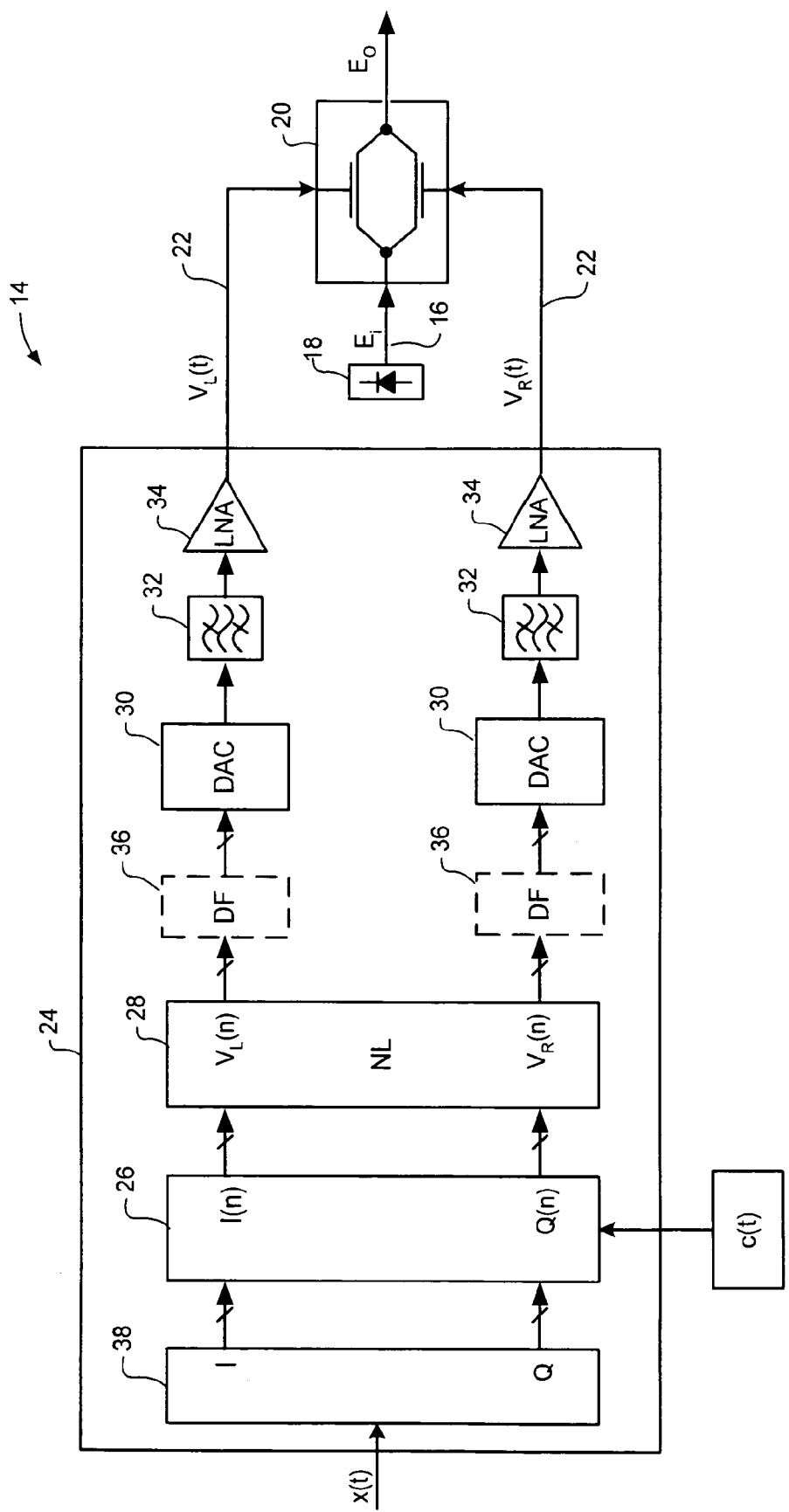
FIG. 2 is a block diagram schematically illustrating principal components of an optical signal synthesizer in accordance with an embodiment of the present invention.

As may be appreciated, known passive filtering techniques cannot produce the required signal waveforms. Instead, arbitrary E-field modulation of a continuous wave (CW) optical signal in the complex (e.g. In-phase and Quadrature) plane is used to synthesize the desired E-field spectrum. Various systems may be used for this purpose. For example, FIG. 2 shows an optical synthesizer 14 designed to perform complex E-field modulation of a Continuous Wave (CW) optical signal 16 generated by a narrow-band laser 18. As described in detail in applicant's co-pending U.S. patent applications Ser. No. 10/262,944, filed Oct. 3, 2002; Ser. No. 10/307,466 filed Dec. 2, 2002; and Ser. No. 10/405,236 filed Apr. 3, 2003; and International Patent Application No. PCT/CA03/01044 filed Jul. 11, 2003, the synthesizer 2 comprises a complex modulator 20 driven by a pair of drive signals 22a, 22b generated by a complex driver circuit 24.

In applicant's co-pending U.S. patent applications Ser. No. 10/262,944, filed Oct. 3, 2002; Ser. No. 10/307,466 filed Dec. 2, 2002; and Ser. No. 10/405,236 filed Apr. 3, 2003; and International Patent Application No. PCT/CA03/01044 filed Jul. 11, 2003, the drive signals 22a, 22b are described as being "orthogonal", in that they represent the complex E-field in terms of Cartesian or polar co-ordinate values, which may be thought of as being nominally (if not strictly) orthogonal. More generally, however, the drive signals may represent the complex E-field in terms of any set of values that can be translated into a complex value.

The complex modulator 20 may be provided by any device capable of driving excursions of the optical E-field in the complex plane. Known devices capable of providing this performance include a dual branch Mach-Zehnder interferometer; cascaded amplitude and phase modulators; and a pair of parallel connected MZ interferometers. Other devices may also be provided for this purpose. In the illustrated embodiments, the complex modulator 20 is provided by a dual branch Mach-Zehnder interferometer.

In the embodiment of FIG. 2, the complex driver circuit 24 comprises a precoder 23 cascaded with a digital filter 26 and a linearizer 28, which cooperate to generate digital drive signals $V_R(n)$ and $V_L(n)$. These digital signals are then converted into corresponding analog voltage levels by respective digital-to-analog converters (DACs) 30, filtered (at 32) to reduce out-of-band noise, and scaled by low noise amplifiers 34 to yield the analog drive signals $V_R(t)$ and $V_L(t)$. If desired, respective digital filters 36 may be positioned between the linearizer 28 and the DACs 30 in order to compensate any propagation delay differences between the DACs 30 and the MZ modulator 20.

The precoder 38 samples the data signal x(t) at a predetermined sample rate (eg. about twice the data rate) and generates corresponding I and Q samples. The digital filter 26 then processes the I and Q samples output by the precoder 38 to generate respective sample streams I(n) and Q(n), which represent the desired (target) complex E-Field waveform at the output of the MZ modulator 4 in Cartesian (In-phase and Quadrature) coordinates. The linearizer 28 uses the target E-field values I(n) and Q(n) to generate the digital drive signals $V_R(n)$ and $V_L(n)$ which, when converted into the analog drive signals $V_R(t)$ and $V_L(t)$ and applied to the MZ modulator 20, will produce an actual E-field waveform $E_O$ that is a high-fidelity reproduction of the desired (target) E-field.

In applicant's co-pending U.S. patent applications Ser. No. 10/262,944, filed Oct. 3, 2002; Ser. No. 10/307,466 filed Dec. 2, 2002; and Ser. No. 10/405,236 filed Apr. 3, 2003; and International Patent Application No. PCT/CA03/01044 filed Jul. 11, 2003, the digital filter 26 implements predistorsion of a serial input signal x(t) in accordance with a compensation function C(t) which substantially compensates impairments of the optical communications link. However, more generally, the complex driver circuit 24 is capable of driving any arbitrary complex E-field modulation of the CW signal 16. In the present invention, this capability is used to synthesize and transmit an optical signal having a desired spectrum selected such that it can be readily dispersion compensated using conventional electrical filtering techniques at the receiver end of the link.

"Pure" OSSB Signal

An optical single sideband (OSSB) signal ideally comprises only the narrow-band carrier and one sideband containing the phase information of the signal. As is known in the art, when such a signal is convolved with itself, the resulting signal contains spectral components that predominantly correspond with the original carrier and sideband. Consequently, when an OSSB signal is detected at the receiver, the electrical signal generated by the photodetector contains the phase information of the single sideband, which enables dispersion compensation using known electrical filtering techniques.

As discussed above, generation of a "pure" OSSB signal using either passive filtering or optical modulation using phase-shifted drive signals is impractical, because of the non-ideal characteristics of real components. In the present invention, this limitation is overcome by using the complex driver circuit 24 to compute a target complex E-field having a spectrum containing only a narrow band carrier and the desired single sideband; and then generate orthogonal drive signals $V_R(n)$ and $V_L(n)$ designed to drive the optical modulator 20 in such a way that the optical signal $E_O$ output from the modulator exhibits the target E-field spectrum. In that respect, it will be noted that the carrier term appearing in the modulator output may or may not correspond with the frequency of the CW signal 16 output by the laser 18. Rather, the carrier may be located anywhere within the modulation bandwidth of the optical modulator 20.

Figure 1A:
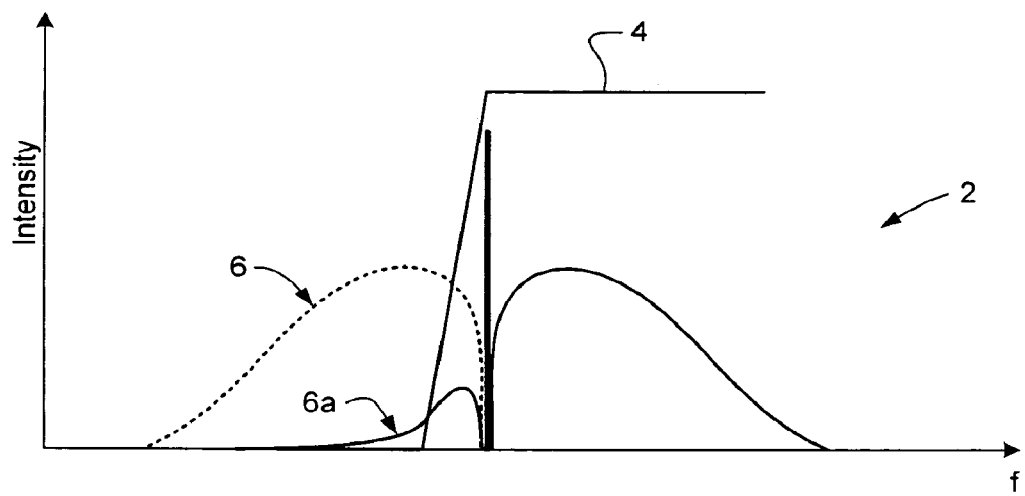
FIGS. 1a-1b schematically illustrate operation of single sideband optical communications systems known in the art.
Figure 1B:
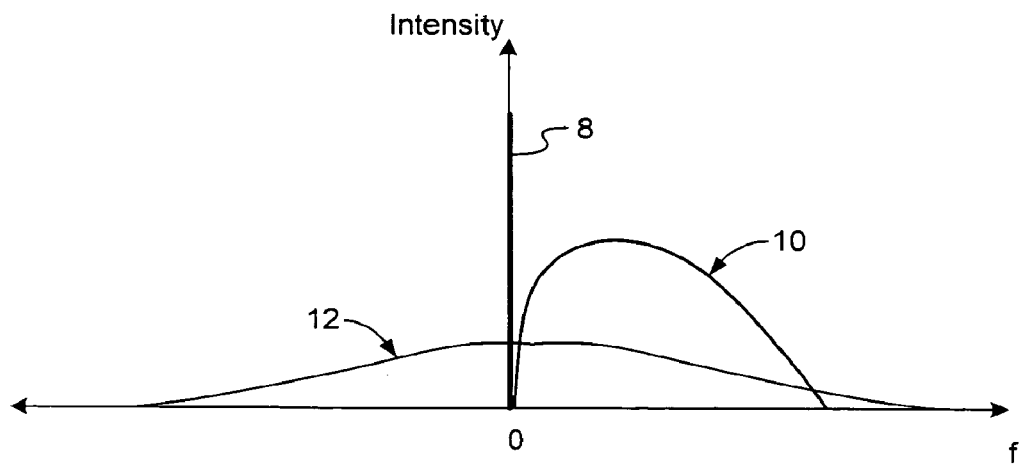

More particularly, the compensation function C(t) used to predistort the serial input signal x(t) in applicant's above-noted copending applications can be replaced by a Hilbert Transform in combination with an analytic filter function having the form $$1 + \frac{\omega}{|\omega|},$$

where ω is the baseband frequency which corresponds with the desired optical carrier frequency. As is known in the art, this filter function vanishes for negative values of ω, thereby providing a true step-function in the frequency domain. Consequently, each of the I and Q sample streams generated by the precoder 38 can be digitally Hilbert transformed and filtered to eliminate frequency components of the optical E-field lying below the carrier frequency. The resulting optical signal emerging from the optical modulator 20 will be a "pure" OSSB signal having only the narrowband carrier and the desired sideband. For all practical purposes, the unwanted sideband (6, FIG. 1a) will not be present, even in a vestigial form.

The synthesis of a "pure" OSSB signal in this manner means that even comparatively high amounts of dispersion can be compensated using conventional transversal filtering techniques. This compensation may be implemented at the receiver-end of the link in a manner known in the art. Conversely, an optical filter having the desired linear group delay response can be used at the transmitter end of the link, to pre-compensate the link dispersion. A still further alternative is to retain the compensation function C(t), which in this case would be implemented "downstream" of the analytic filter function. In this case, the compensation function C(t) operates on the analytic filter function output, to digitally pre-compensate the OSSB signal for dispersion effects (and other impairments) of the link.

An advantage of this technique is that it does not impose severe restrictions on the modulation format used to encode data being transmitted. For example, phase shift keying (PSK) modulation formats, such as differential phase shift keying (DPSK) and quadrature phase shift keying (QPSK), may be used, if desired.

Signals Composed of a Series of Optical Phases

As is known in the art, the convolution of the E-field spectrum with itself contains a respective signal component produced by beating each spectral component (of the E-field) with each one of the other spectral components. Where two or more pairs of different spectral components share a common frequency difference, the respective beat terms will be summed. However, because the phase of the involved beat terms depend upon the dispersion, the sum is a complicated nonlinear function of the dispersion. Accordingly, a criterion for an optical signal that is easily compensated at the receiver is that the convolution of the E-field spectrum with itself does not contain substantial terms that are the sum of the beat terms associated with two (or more) different pairs of spectral components having the same separation.

Because the optical synthesizer 14 is capable of generating any arbitrary optical E-field spectrum (within the modulation range of the optical modulator 20), it is possible to generate the E-field spectrum as a set of pure tones distributed in the frequency domain. This facilitates the generation of an artificial spectrum that is easily dispersion compensated, because its convolution contains no beat terms that will sum, as will be described below.

Figure 3A:
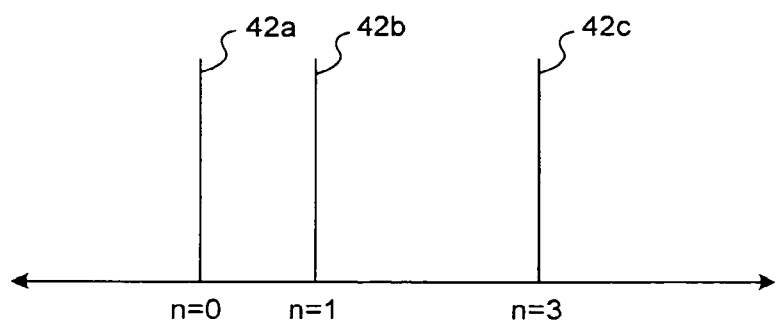
FIGS. 3a-3b schematically illustrate an optical signal composed of a set of pure tones, in accordance with an embodiment of the present invention.
Figure 3B:
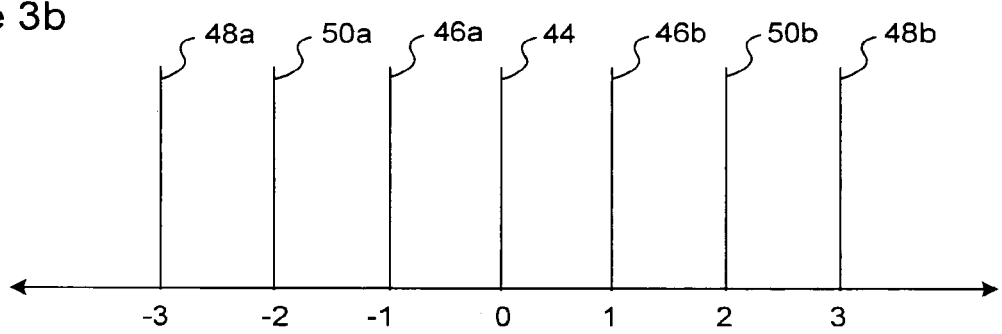

A simple E-field spectrum that is easily dispersion compensated is composed of a set of pure spectral tones, where the frequency of each tone, above the first tone follows a set of frequency intervals selected such that no two tone pairs have the same frequency difference. For example, a set of three pure tones 42 arranged at frequency intervals of nω, where n={0, 1, 3} as shown in FIG. 3a, satisfies this condition. The convolution of this signal spectrum with itself contains: a beat term 44 at n=0 which is the sum of the beating of each tone with itself; and respective beat terms at n=±1, n=±2 and n=±3 produced by beating each of the possible tone pairs, as shown in FIG. 3b. Since each tone pair has a unique frequency difference, each of the beat terms at n=±1, n±+2 and n±+3 is uniquely associated with a single pair of tones. More particularly, the beat terms 46 lying at ±1 are produced by beating the first and second tones (n=0 and n=1); the beat terms 48 lying at ±3 are produced by beating the first and third tones (n=0 and n=3); and the beat terms 50 lying at ±2 are produced by beating the second and third tones (n=1 and n=3). Since none of the beat terms at n=±1, n=±2 and n=±3 are produced by summing beats generated by two or more different tone pairs, the phase of each beat term is unaffected by dispersion. It may be noted that the optical E-field spectrum may be composed of more than three pure tones. For example, n={0, 1, 3, 10, 23, 27, 35, 41, 56, 84, 95, 100} is the largest set with this property with the restriction that n≦100.

Figure 4A:
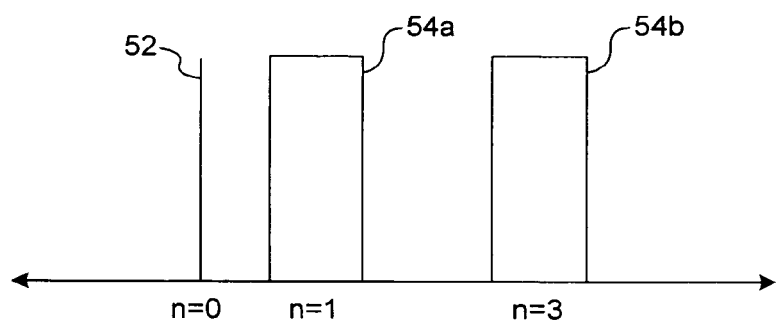
FIGS. 4a-4b schematically illustrate an optical signal composed of a set of pure tones, in accordance with an embodiment of the present invention.
Figure 4B:
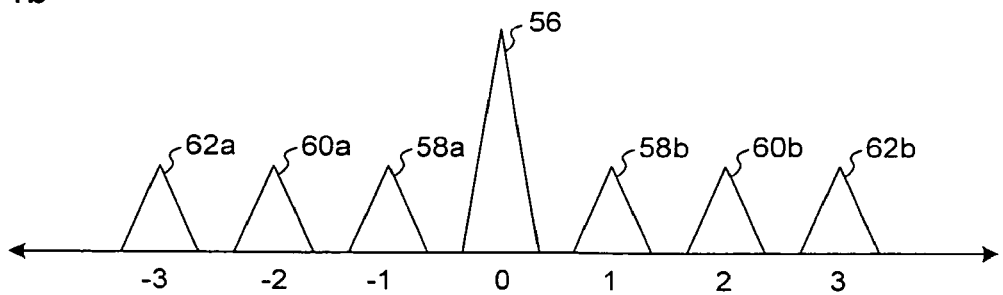

The above-described optical signal composed of a series of pure tones can be also be applied to data bands, as shown in FIGS. 4a and 4b. In this case, the tone lying at n=0 is used as a common narrowband carrier signal 52, while each of the other tones 54 (at n=1 and n=3) are replaced by a data band having a bandwidth of 0.5ω, as shown in FIG. 4a.

As may be seen in FIG. 4b, the convolution of this signal spectrum with itself is characterized by a region 56 of summed beat terms lying between ±0.25, which can be easily filtered out. All of the other beat terms lie at unique frequencies, and thus the detected spectral density does not change as a function of dispersion. The beat 58 terms lying at ±1 are produced by beating the carrier 52 (n=0) with the first data band 54a (at n=1); the beat terms 60 lying at ±2 are produced by beating the first and second data bands 54a and 54b (n=1 and n=3, respectively); and the beat terms 62 lying at ±3 are produced by beating the carrier (n=0) with the second data band 54b (n=3). As in the case of pure tones the beat terms at n=±1, n=±2 and n=±3 are uniquely associated with a single pair of spectral components (i.e. the carrier 52 and data bands 54), so these terms can be easily dispersion compensated using conventional filtering techniques. Furthermore, it will be seen that the beat terms 58 and 62 (at n=±1 and n=±3) are produced by beating the carrier 52 with a respective one of the data bands 54. As a result, these data bands may be used to carry the same, or different data, as desired. Separation of the respective data streams carried by each data band can be easily accomplished by appropriate filtering in the receiver. Note that in cases where the data bands are used to carry different data, the beat terms 60 (at n=±2) will be a complicated function of the two data streams, and may therefore be separated by filtering and discarded.

The embodiment(s) of the invention described above is(are) intended to be exemplary only. The scope of the invention is therefore intended to be limited solely by the scope of the appended claims.

We claim:

1. A method of mitigating effects of dispersion in an optical link, the method comprising steps of:
    synthesizing a pair of digital sample streams representing a target optical E-field having a spectrum comprising a set of two or more spectral components arranged at frequency intervals selected such that convolution of the spectrum with itself yields a signal having a respective beat term that contains phase information of a unique one of the spectral components; and
    driving a complex optical modulator in accordance with the synthesized digital sample streams.

2. A method as claimed in claim 1, wherein the set of two or more spectral components comprises any one of:
    a set of pure tones arranged at frequency intervals selected such that each of the possible pairs of tones has a respective unique frequency difference; and
    a narrowband carrier and one or more data bands arranged at frequency intervals selected such that each combination of the carrier and one of the data bands, and each of the possible pairs of data bands have respective unique frequency differences.

3. A method as claimed in claim 1, wherein the digital sample streams comprise respective series of In-Phase (I) and Quadrature (Q) sample values.

4. A method as claimed in claim 3, wherein the step of synthesizing the digital sample streams comprises steps of:
    precoding an input serial data stream x(t) to generate a corresponding series of I and Q values;
    computing a respective Hilbert transform of each series; and
    digitally filtering each transform result using a filter function of the form $$1 + \frac{\omega}{|\omega|},$$

where ω is a baseband frequency of the input serial data stream x(t), such that frequency components of the optical B-field lying below a carrier frequency are substantially eliminated.

5. A method as claimed in claim 4, further comprising a step of digitally processing an output of the filter function using a compensation function which substantially compensates impairments of the optical link.

6. A system for mitigating effects of dispersion in an optical link, the system comprising:
    digital signal processing means for synthesizing a pair of digital sample streams representing a target optical B-field having a spectrum comprising a set of two or more spectral components arranged at frequency intervals selected such that convolution of the spectrum with itself yields a signal having a respective beat term that contains phase information of a unique one of the spectral components; and
    means for driving the complex optical modulator in accordance with the digital sample streams.

7. A system as claimed in claim 6, wherein the set of two or more spectral components comprises any one of:
    a set of pure tones arranged at frequency intervals selected such that each of the possible pairs of tones has a respective unique frequency difference; and
    a narrowband carrier and one or more data bands arranged at frequency intervals selected such that each combination of the carrier and one of the data bands, and each of the possible pairs of data bands have respective unique frequency differences.

8. A system as claimed in claim 6, wherein the digital sample streams comprise respective series of In-Phase (I) and Quadrature (Q) sample values.

9. A system as claimed in claim 8, wherein the digital signal processing means comprises:
    a precoder for sampling an input serial data stream x(t) to generate a corresponding series of I and Q values; and
    a digital filter adapted to:
        compute a respective Hilbert transform of each series; and
        digitally filter each transform result using a filter function of the form $$1 + \frac{\omega}{|\omega|},$$

where ω is a baseband frequency of the input serial data stream x(t), such that frequency components of the optical E-field lying below a carrier frequency are substantially eliminated.

* * * * *